United States Patent [19]
Ottesen et al.

[11] Patent Number: 5,739,994
[45] Date of Patent: Apr. 14, 1998

[54] OPTIMALLY BANDED DISK FOR USE WITH MULTIPLE FREQUENCY CHANNEL

[75] Inventors: Hal Hjalmar Ottesen; Gordon J. Smith, both of Rochester, Minn.

[73] Assignee: International Business Machines Corporation, Armonk, N.Y.

[21] Appl. No.: 626,731

[22] Filed: Apr. 1, 1996

[51] Int. Cl.$^6$ ...................................................... G11B 5/82
[52] U.S. Cl. ........................................................ 360/135
[58] Field of Search ................................. 360/135, 39, 55

[56] References Cited

U.S. PATENT DOCUMENTS

| 4,864,428 | 9/1989 | Kanamaru | 358/342 |
| 4,894,734 | 1/1990 | Fischler et al. | 360/51 |
| 5,235,473 | 8/1993 | Sato et al. | 360/66 |

FOREIGN PATENT DOCUMENTS 60-171672  2/1984  Japan .

OTHER PUBLICATIONS

JP 4092254 A, published Mar. 25, 1992, Hard Disk Memory Device.
JP5342585, published Dec. 24, 1993, Information Reproducing Device.

Primary Examiner—Robert S. Tupper
Attorney, Agent, or Firm—William D. Miller

[57] ABSTRACT

A memory device using at least one disk is disclosed the memory device uses a banded disk. The disk is optimally banded for use in a multiple frequency zoned disk storage device. The allocation of track locations into zones on the disk reduces the number of zone bit frequencies the storage device must handle when the disk is rotated at more than one discrete disk velocity.

15 Claims, 10 Drawing Sheets

| ZONE | Radii (mm) | RPM 3600 | 3339 | 3097 | 2873 | 2665 | 2472 | 2293 | 2127 | 1972 | 1830 |
|---|---|---|---|---|---|---|---|---|---|---|---|
| 1 | 27.55 | 6.8998 | 6.3999 | 5.9363 | 5.5062 | 5.1072 | 4.7372 | 4.3940 | 4.0757 | 3.7804 | 3.5065 |
| 2 | 25.55 | 6.3999 | 5.9363 | 5.5062 | 5.1072 | 4.7372 | 4.3940 | 4.0757 | 3.7804 | 3.5065 | 3.2524 |
| 3 | 23.70 | 5.9363 | 5.5062 | 5.1072 | 4.7372 | 4.3940 | 4.0757 | 3.7804 | 3.5065 | 3.2524 | 3.0168 |
| 4 | 21.98 | 5.5062 | 5.1072 | 4.7372 | 4.3940 | 4.0757 | 3.7804 | 3.5065 | 3.2524 | 3.0168 | 2.7982 |
| 5 | 20.39 | 5.1072 | 4.7372 | 4.3940 | 4.0757 | 3.7804 | 3.5065 | 3.2524 | 3.0168 | 2.7982 | 2.5955 |
| 6 | 18.91 | 4.7372 | 4.3940 | 4.0757 | 3.7804 | 3.5065 | 3.2524 | 3.0168 | 2.7982 | 2.5955 | 2.4075 |
| 7 | 17.54 | 4.3940 | 4.0757 | 3.7804 | 3.5065 | 3.2524 | 3.0168 | 2.7982 | 2.5955 | 2.4075 | 2.2330 |
| 8 | 16.27 | 4.0757 | 3.7804 | 3.5065 | 3.2524 | 3.0168 | 2.7982 | 2.5955 | 2.4075 | 2.2330 | 2.0713 |
| 9 | 15.09 | 3.7804 | 3.5065 | 3.2524 | 3.0168 | 2.7982 | 2.5955 | 2.4075 | 2.2330 | 2.0713 | 1.9212 |
| 10 | 14.00 | 3.5065 | 3.2524 | 3.0168 | 2.7982 | 2.5955 | 2.4075 | 2.2330 | 2.0713 | 1.9212 | 1.7820 |

GEOMETRIC PROGRESSION

FIG. 6A

| ZONE | Radii (mm) | RPM 3600 | 3399 | 3198 | 2997 | 2796 | 2595 | 2395 | 2194 | 1993 | 1792 |
|---|---|---|---|---|---|---|---|---|---|---|---|
| 1 | 28.13 | 7.0455 | 6.6523 | 6.2591 | 5.8659 | 5.4726 | 5.0794 | 4.6862 | 4.2929 | 3.8997 | 3.5065 |
| 2 | 26.56 | 6.6523 | 6.2810 | 5.9098 | 5.5385 | 5.1672 | 4.7959 | 4.4246 | 4.0533 | 3.6821 | 3.3108 |
| 3 | 24.99 | 6.2591 | 5.9098 | 5.5604 | 5.2111 | 4.8618 | 4.5124 | 4.1631 | 3.8137 | 3.4644 | 3.1151 |
| 4 | 23.42 | 5.8659 | 5.5385 | 5.2111 | 4.8837 | 4.5563 | 4.2289 | 3.9015 | 3.5741 | 3.2468 | 2.9194 |
| 5 | 21.85 | 5.4726 | 5.1672 | 4.8618 | 4.5563 | 4.2509 | 3.9454 | 3.6400 | 3.3346 | 3.0291 | 2.7237 |
| 6 | 20.28 | 5.0794 | 4.7959 | 4.5124 | 4.2289 | 3.9454 | 3.6619 | 3.3784 | 3.0950 | 2.8115 | 2.5280 |
| 7 | 18.71 | 4.6862 | 4.4246 | 4.1631 | 3.9015 | 3.6400 | 3.3784 | 3.1169 | 2.8554 | 2.5938 | 2.3323 |
| 8 | 17.14 | 4.2929 | 4.0533 | 3.8137 | 3.5741 | 3.3346 | 3.0950 | 2.8554 | 2.6158 | 2.3762 | 2.1366 |
| 9 | 15.57 | 3.8997 | 3.6821 | 3.4644 | 3.2468 | 3.0291 | 2.8115 | 2.5938 | 2.3762 | 2.1585 | 1.9408 |
| 10 | 14.00 | 3.5065 | 3.3108 | 3.1151 | 2.9194 | 2.7237 | 2.5280 | 2.3323 | 2.1366 | 1.9408 | 1.7451 |

ARITHMETIC PROGRESSION

FIG. 6B

OPTIMALLY BANDED DISK FOR USE WITH MULTIPLE FREQUENCY CHANNEL

BACKGROUND OF THE INVENTION

The present invention is directed to an improved allocation of information on disk storage media, and in particular to an improved allocation of track locations on the disk storage media using multiple frequency zones.

One of the key components of some electrical devices is a place to store and read data. For example, compact disk players read data, such as music, from a plastic disk. Another example is a VCR which reads data from a tape. Computer systems also store and read large amounts of data. Typically computer systems employ a number of storage means to store data. One of the places where a computer can store data is in a disk drive which is also called a direct access storage device.

Although this invention is hot limited to a direct access storage device one will be described by way of example. A disk drive or direct access storage device includes several disks which look similar to records used on a record player or compact disks which are used in a CD player. The disks are stacked on a spindle, much like several records awaiting to be played. In a disk drive, however, the disks are mounted to the spindle and spaced apart so that the separate disks do not touch each other.

The surface of each disk is uniform in appearance. However, in actuality, each of the surfaces is divided into portions where data is stored. There are a number of tracks situated in concentric circles like rings on a tree. Each track in a disk drive is further subdivided into a number of sectors which is essentially just one section of the circumferential track.

Storage of data on a magnetic disk entails magnetizing portions of the disk in a pattern which represents the data. To store data on a disk the disk is magnetized. In order to magnetize the magnetic layer, a small ceramic block which contains a magnetic transducer known as a write element is passed over the surface of the disk. More specifically, the write element is flown at a height of approximately six millionths of an inch from the surface of the disk and is flown over the track as the write element is energized to various states causing the track below to be magnetized to represent the data to be stored. In some applications the write element is the same as the read element. Other applications use a separate write element and a separate read element.

To retrieve data stored on a magnetic disk, a read element, located in close proximity to the write element, is flown over the disk. The magnetized portions of the disk provide a signal from the read element. By looking at output from the read element, the data can be reconstructed and then used by the computer system.

Like a record, both sides of a disk are generally used to store data or other information necessary for the operation of the disk drive. Since the disks are held in a stack and are spaced apart from one another, both the top and the bottom surface of each disk in the stack of disks has its own read element and write element. This would be comparable to having a stereo that could play both sides of a record at once. Each side would have a stylus which played the particular side of the record.

Disk drives also have something that compares to the tone arm of a stereo record player. There are two types of disk drives, rotary and linear. Rotary disk drives have a tone arm that rotates much like a record player. The tone arm of a rotary disk drive, termed an actuator arm, holds all the transducers or read/write elements, one head for each surface of each disk supported in a structure that looks like a comb. Sometimes the structure is called an E-block. Like a tone arm, the actuator arms rotate so that the read element and write element attached to the actuator arm can be moved to locations over various tracks on the disk. In this way, the write element can be used to magnetize the surface of the disk in a pattern representing the data at one of several track locations. The read element is used to detect the magnetized pattern on one of the tracks of a disk. For example, the needed data may be stored on two different tracks on one particular disk, so to read the magnetic representations of data, the actuator arm is rotated from one track to another track.

It should be noted that this invention is not limited to use in disk drives using magnetic media but is useful in any device having rotating media. In this particular application, where magnetic media is described as an example it should be recognized that the invention would be useful in other storage devices which have different types of media or read and write elements.

The need for high capacity direct access storage devices (DASD), such as magnetic disk drives, has increased substantially in recent years. Also, in order to conserve power and to make storage devices light weight and portable, it has also become desirable to reduce the size of the storage device. For example, in disk drives, in order to provide a light weight compact design and to conserve power consumption by the disk drive, smaller disks have been increasingly employed. The increasing demand for high storage capacity while using smaller disks present competing interests to the disk drive developer.

One technique used to increase the storage capacity of a rotating disk is zone bit recording (ZBR). The principle behind ZBR is that at a constant spindle velocity, the linear speed of the disk surface as it moves past the transducer varies as the transducer is moved from the inner portions of the disk to the outer edges of the disk. In particular, the linear speed of the disk surface is greater at the outer edge of the disk. ZBR takes advantage of this higher linear velocity by increasing the frequency at which data is recorded to the disk at the outer portions of the disk in order to increase the linear density of the recorded data.

Ideally, the write frequency could be selected as a function of the radial position of the head such that the linear density of recorded transitions, such as data, is the same across the entire surface of the disk. Thus, in such a system the linear density of data recorded on the disk is constant for each track on the disk. In practice, however, it is not necessary to change the density for each track location. Rather, the disk may be divided into a number of concentric zones made up of a band of adjacent track locations. The track locations correspond to concentric data tracks which may be either a number of concentric circles or one or more continuous concentric spiral tracks. A zone frequency is assigned to each zone at which data is written to and read from the disk. The zone frequency is typically selected for each zone such that the linear density of data at the innermost track of each zone is substantially constant. In this manner, the overall storage capacity of the disk can be significantly increased.

One drawback associated with multiple zone disk drives (e.g., ZBR) is that the use of multiple frequencies increases the complexity of the data storage device. For example, the data channel used in a disk drive must be capable of handling a number of different data rates as a result of the multiple frequency zones. The present invention provides an improved allocation of a disk surface into multiple frequency zones.

SUMMARY OF THE INVENTION

Generally, the present invention provides an improved allocation of track locations into multiple frequency zones. In one particular embodiment, the present invention is implemented in the form of a storage medium which has concentric track locations allocated into N concentric zones, N being an integer greater than 2. Data is stored at an inner radius of each zone on the storage medium at a substantially constant linear density. Radii $r_i$ defining each of the N concentric zones are selected such that the ratio of radii $r_i$ defining any two adjacent ones of the zones are substantially constant.

The above summary of the present invention is not intended to present each embodiment or every aspect of the present invention. Rather, the invention will be understood by reference to the figures and the associated description which follow.

BRIEF DESCRIPTION OF THE DRAWINGS

The invention may be more completely understood in consideration of the following detailed description of various embodiments of the invention in connection with the accompanying drawings, in which:

FIGS. 6A and 6B, respectively, are tables depicting the geometrically and arithmetically located zone radii and frequency as a function of varying spindle speed for a 2.5" disk drive.

Figure 1:
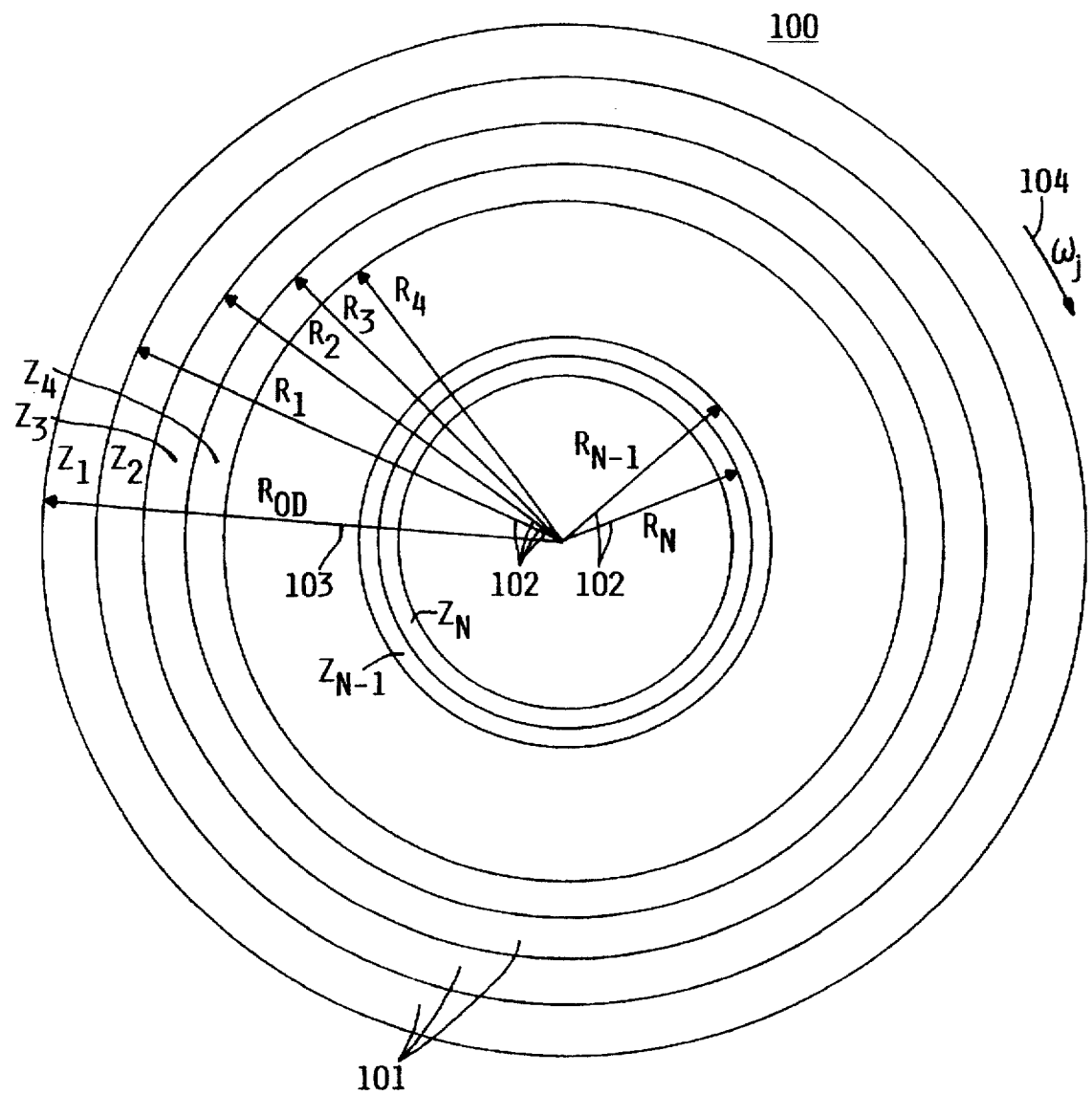
FIG. 1 illustrates a disk surface having a number of recording zones.

While the invention is amenable to various modifications and alterative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention provides an improved allocation of a disk surface into multiple frequency zones, which is especially advantageous when the disk is rotated at a number of different discrete disk velocities. Advantages obtained by operating a disk storage device at multiple discrete disk velocities are described in the related application Ser. No. 08/625,334 filed on Apr. 1, 1996, entitled "Power Saving Method and Apparatus for use in Multiple Frequency Zone Drives" and having an attorney docket number IBM RO995-090, and application Ser. No. 08/625,201 filed on Apr. 1, 1996, entitled "Disk Drive Having Optimized Spindle Speed for Environment" and having an attorney docket number IBM RO995-108, the contents of which are both incorporated herein by reference. While the invention relates in general to any type of direct access storage device, such as magnetic and optical disk drives, CD ROMs and the like, the exemplary embodiments provided below describe a disk drive for purposes of illustration. The implementation of the described features in other types of storage devices will be apparent from the description.

In accordance with an aspect of the present invention, a disk surface is partitioned into a number of concentric zones or bands of track locations. As will become more apparent from the description which follows, the manner in which the tracks are allocated into zones reduces the complexity of a data channel used to read data from and/or write data to the track locations. In accordance with an embodiment of the invention the tracks are partitioned into concentric bands or zones $Z_i$ defined by a radius $r_i$ corresponding to each band or zone. The radius $r_i$ is determined according to a geometric progression which maintains a substantially constant ratio of radii between adjacent bands or zones. In other words, $r_i/r_{i+1}$ is substantially equal to K, where K equals a constant. The advantages obtained using such an allocation will be apparent from the examples provided below.

A diagram illustrating a disk surface using multiple frequency recording zones is illustrated in FIG. 1. In FIG. 1, a disk 100 has N zones 101 each made up of a band of concentric tracks or track locations (not shown). The zones 101 progress from zone $Z_1$ at the outer diameter of the disk to zone $Z_N$ at the inner diameter of the disk. The zones 101 may be defined by the inner radii 102 of the zones. The radius $R_i$ corresponds to the inner radius of zone $Z_i$. The radius 103 of the disk defines an outer diameter $R_{OD}$ of the disk.

The disk 100 is rotated by a spindle motor at a velocity $\omega_j$ in the direction of arrow 104. As described more fully below, the disk may be rotated at two or more discrete velocities $\omega_j$. The particular velocity $\omega_j$ used can be determined on the basis of the operating mode in which the disk drive is being used.

As described more fully below, data may be written to the each of the zones at different write frequencies while the disk is rotated at a constant velocity, as is conventionally known in ZBR drives, such that all write operations are carried out at the same spindle velocity with a write frequency selected according to the zone. Alternatively, data may be written to the disks at different spindle speeds. When different spindle speeds are used for write operations the write frequency for a particular zone is selected such that the linear density for data written to the innermost track of each zone is maintained substantially constant.

Data may also be read from the disk at two or more spindle velocities. The linear data rate as the disk is read, (i.e., the rate at which data is presented to the read head) also varies as the speed of the spindle motor is changed. In other words, the rate at which data bits, represented by transitions in the signal, are presented to the transducer for a given zone varies as the spindle motor speed changes. Hereinafter, the rate at which data is presented to a transducer in a particular zone at a given spindle velocity will be referred to as the "zone bit frequency". Thus, as used herein, the term "zone bit frequency" is used to represent the rate at which bits of data are presented to (or written by) the transducer. This is a function of both the linear density of the data in the zone and the rotational speed of the disk (i.e., the spindle velocity).

Figure 2:
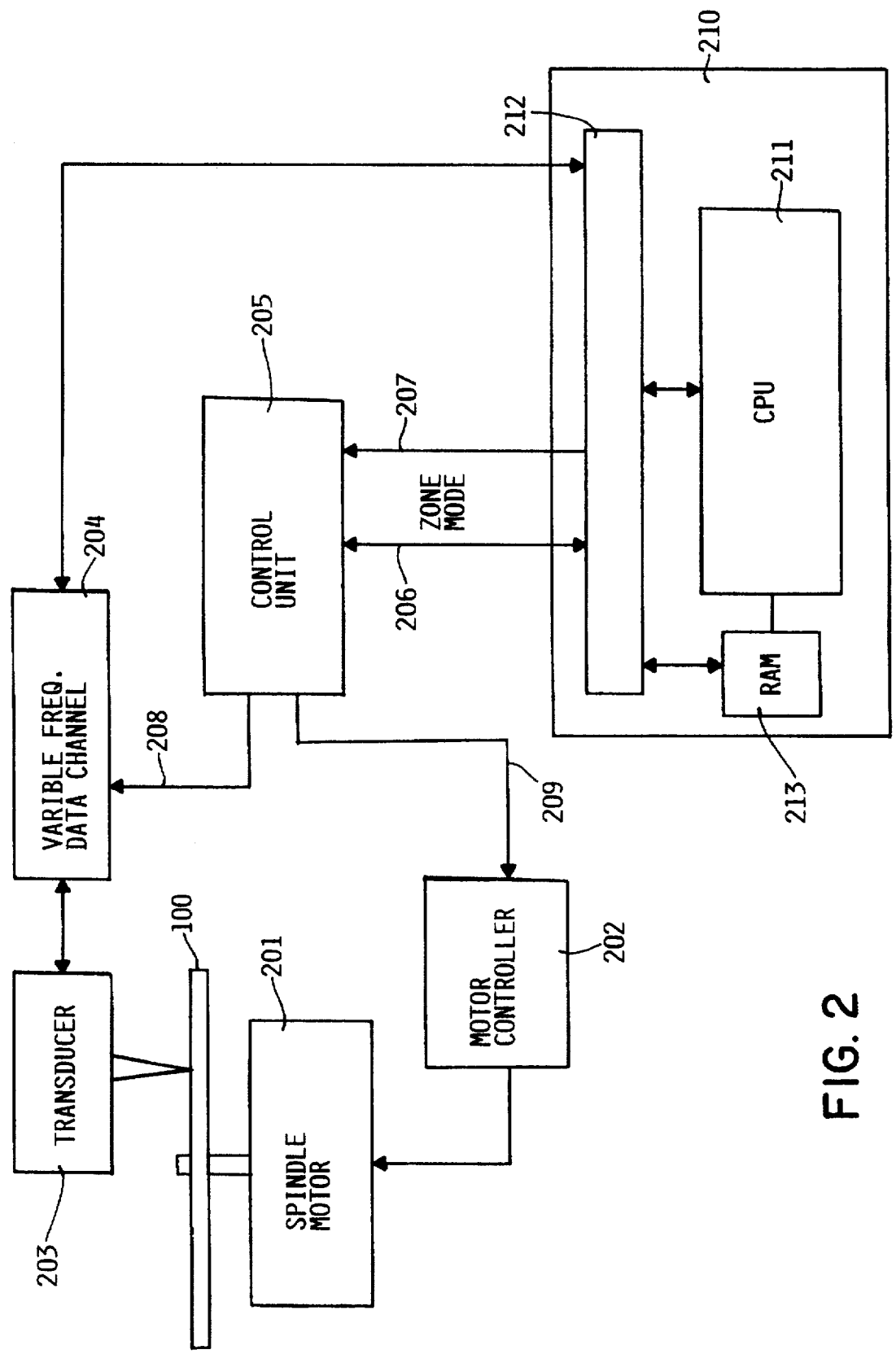
FIG. 2 depicts a block diagram of an exemplary environment for use of the present invention.

The components of a disk drive used to control the spindle velocity and operating frequency of a data channel are illustrated in FIG. 2 in block diagram form. In FIG. 2, the disk 100 is rotated by a spindle motor 201. The rotational velocity of the spindle motor 201 is controlled by a motor controller 202. The motor controller 202 is provided to rotate the spindle motor 201 and hence the disk 100, at a number of known, discrete velocities $\omega_j$. A transducer 203 is positioned adjacent the disk 100 to read and/or write information to and from the surface of the disk 100.

The transducer 203 may be mounted to a rotary actuator (not shown), for example, to position the transducer over a desired track location. The radial position of the transducer 203 relative the disk determines which zone of the disk 100 is being accessed. The transducer 203 is connected to a variable frequency data channel 204 which may be used to read and write signals from and to the disk at an appropriate zone bit frequency for a selected zone and disk speed. In a read operation, for example, the transducer 203 provides a raw signal of information read from the disk to the data channel 204 which extracts data from the signal at the appropriate frequency for the given zone and spindle speed. The data read from the disk 100 is supplied from the adaptive variable frequency data channel 204 to processing interface 212 which processes the signal for use by the CPU 211 of a computer 210 using the disk drive.

A control unit 205 is connected to the adaptive variable frequency data channel 204 and the motor controller 202. The control unit 205 receives a zone control signal 206 and a mode control signal 207 from the processing interface 212. The zone control signal 206 indicates the zone at which the transducer 203 is performing an access operation. This information can be obtained by any of the conventionally known methods for determining head position. For example, zone information may be obtained from the transducer as it reads servo information from the surface of the disk.

The mode control signal 207 informs the control unit 205 of an operating mode of the disk storage device. The advantages described more fully below are useful in any type of storage device where different operating modes are employed having different disk velocities. For example, a disk storage device may include a power savings mode where the disk is operated at a lower disk velocity to conserve power. The initiation of such a mode is provided to the control unit 205 as the mode control signal 207. Other types of systems which may benefit from multiple disk velocity modes include storage devices having an archival mode where disks are rotated at velocities lower than usual, interactive applications where disk are typically rotated at a higher than normal velocity, high swapping of data between a random access memory (RAM) and disk, use of different disk velocities depending upon the environment in which the disk drive is operated and the like. In another example, if the drive is running hot, it may be desirable to reduce disk velocity to cool the drive down.

On the basis of the mode control signal 207, the control unit supplies a motor speed control signal 209 to the motor controller 202 to cause the spindle motor 201 to rotate the disk at the appropriate velocity. The control unit 205 also determines, on the basis of the zone control signal 206 and the mode control signal 207, the appropriate zone bit frequency for accessing the disk zone 101. The zone bit frequency is determined on the basis of both the mode control signal 207, which reflects the spindle motor 201 velocity and the zone control signal 206 which reflects the relative rate at which the data is written to the disk at the particular zone. The appropriate zone bit frequency is communicated to the variable data channel 204 on line 208 from the control unit 205.

The processing interface 212 processes information and provides an interface to the main CPU 211 of the computer 210 using the disk storage device. The operation of this circuitry may be understood from the detailed example provided below.

Figures 1, 3A:
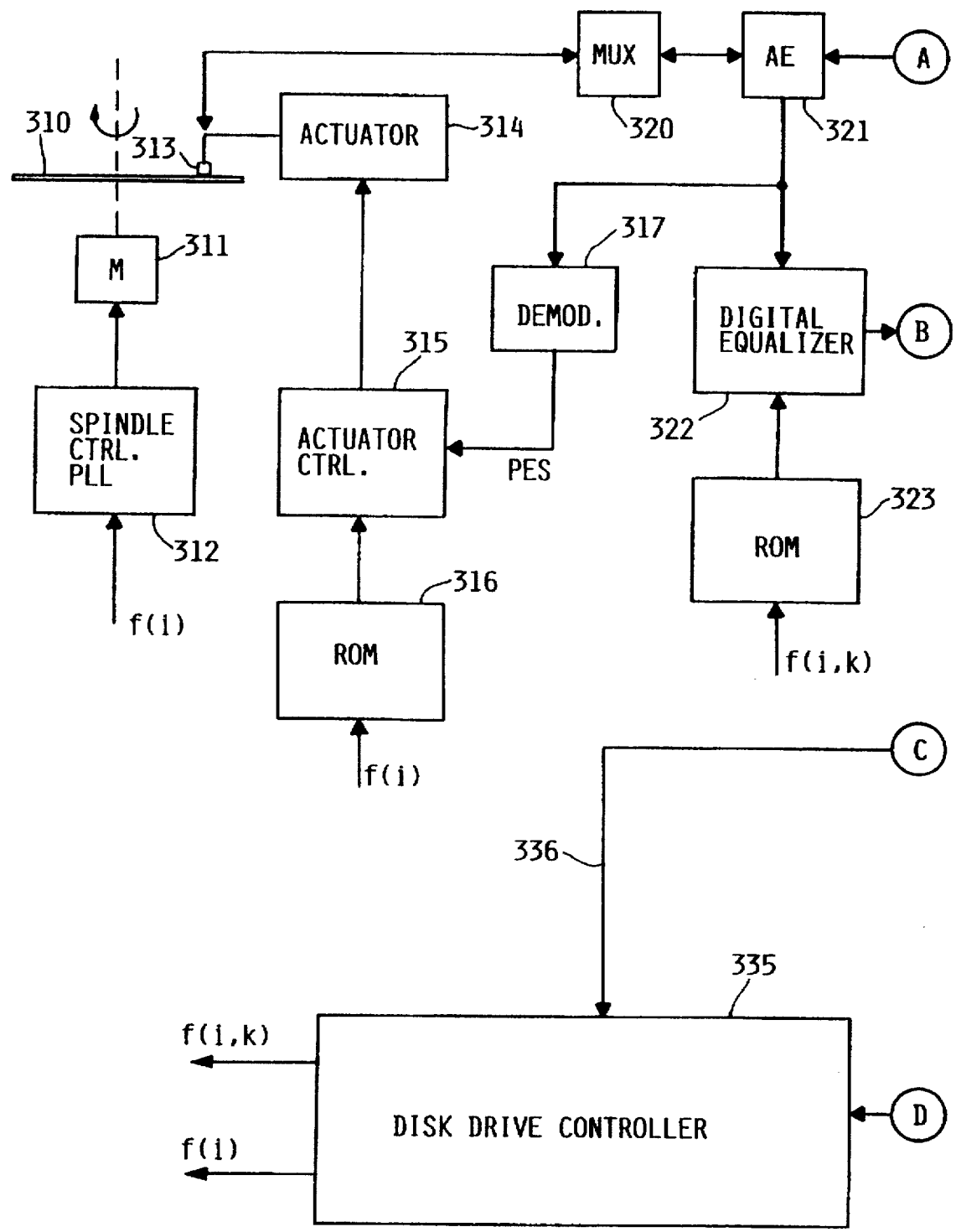
FIGS. 3A and 3B depict systems exemplifying various operating environments of the present invention.
Figures 2, 3A:
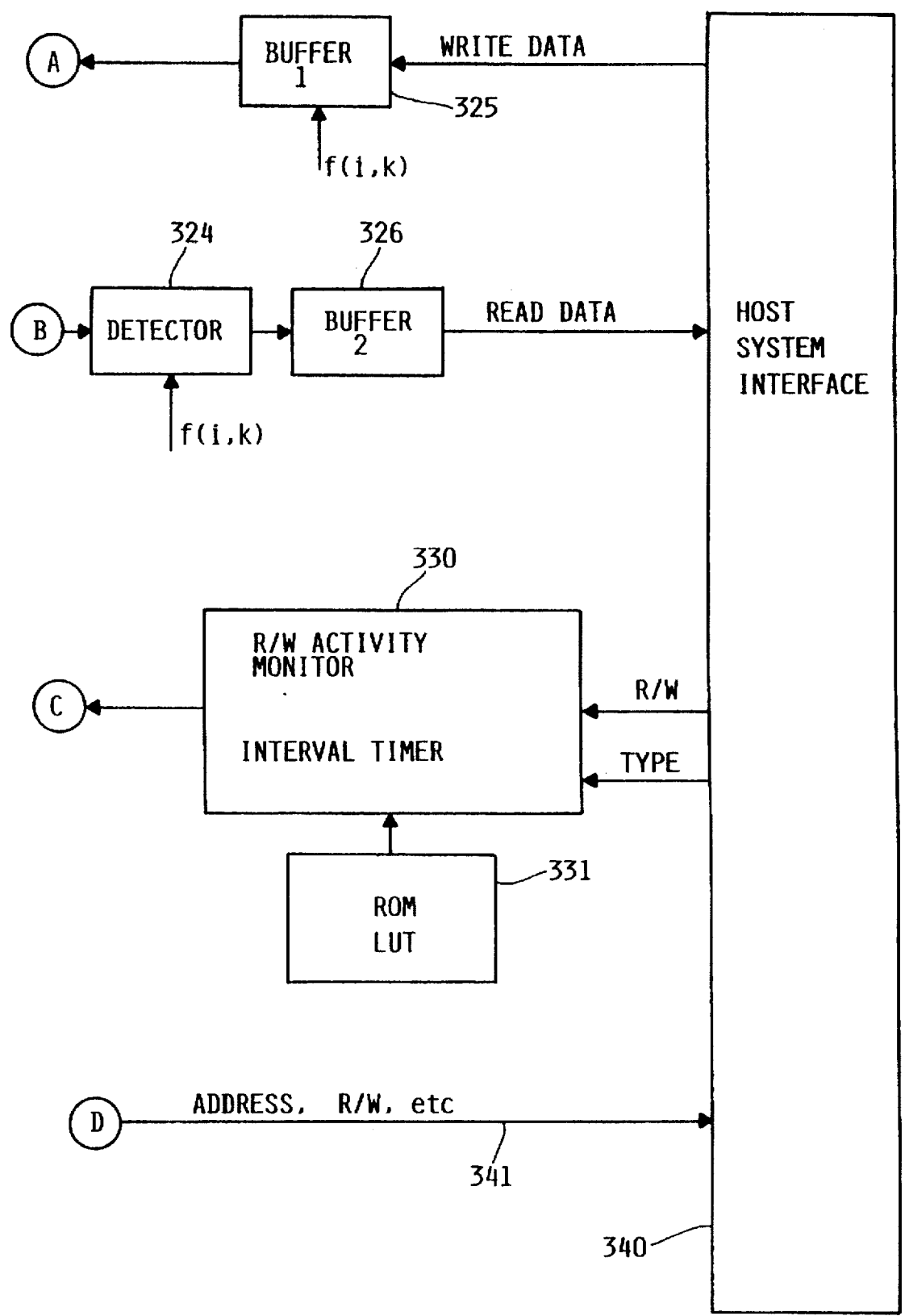

As noted above, optimal banding of track locations into zones is especially advantageous whenever more than one spindle velocities are used. An example of a system using multiple spindle velocities is described in the above referenced patent application Ser. No. 08/625,334. Such a system is depicted in FIG. 3A, as an exemplary system in which the present invention may be implemented. In FIG. 3A, a recording head 313 is positioned to read and write information from and to the surface of disk 310. It is noted that while only a single disk is illustrated in FIG. 3A, multiple disks and heads may be used. An actuator assembly 314, including a voice coil motor (VCM), is provided to move the head 313 relative to the rotating disk 310. A spindle motor 311 is provided to rotate the disk 310. The spindle motor 311 is controlled by a spindle controller 312. The spindle controller 312 may be implemented with a phase locked loop (PLL) such that the speed of the spindle motor 311 may be controlled by applying a frequency control signal f(i) to the spindle controller 312. It is noted that the various control elements illustrated in FIG. 3A, while shown as discrete blocks may be implemented on a microprocessor using microcode. Moreover, a number of different microprocessors may be used, each implementing one or more of the described functions. The present description describes the functional operation of the various elements whether implemented as microcode or as discrete circuits.

An adaptive actuator controller 315 is provided to control the actuator 314. The adaptive actuator controller 315 uses a set of coefficients stored in a read-only memory (ROM) 316. The ROM 316 stores one set of coefficients for each discrete rotational velocity of the disk 310. The disk velocity is changed under control of the frequency control signal f(i) from one discrete velocity to another. As the disk velocity is changed, the adaptive actuator controller 315 loads a new set of a coefficients corresponding to the new disk velocity. The different coefficients are required because of the change in sampling rate of servo information formed by transducer 313 and servo patterns written at equispaced radial sectors on the disk and decoded by demodulator 317 and used to produce a position error signal (PES). The coefficients are used to adjust the dynamic operation of the adaptive actuator controller 313 thereby optimizing actuator access and tracking performance. The position error signal is used for servo control to keep the head 313 aligned over the correct track location. If the disk 310 is slowed down, for example, the sampling of the position error signals will be slower than when the disk 310 is rotated at the faster nominal speed. The adaptive actuator controller 315 must be dynamically reconfigured to work with the proper sampling rate of the position error signal. Information read from or written to the disk 310 passes through a multiplexer 320. The multiplexer 320 selects a head from various heads respectively corresponding to multiple disk surfaces (only one head 313 is shown in FIG. 3A). The multiplexer 320 is coupled to the arm electronics (AE) module 321. The arm electronics module 321 is coupled to buffer 325 to receive data to be written the disk during a write operation. Buffer 325 is coupled to a host system interface 340 which in turn is coupled to the host system such as the processing unit of a portable computer. Data is typically passed from the host system interface 340 to the buffer 325 at a fixed rate (i.e., at a fixed number of bytes-per-second). The data is then stored in buffer 325. The data is clocked from the buffer 325 to the disk via the arm electronics module 321 and the multiplexer 320 at a rate (or frequency) which depends on the disk velocity and the zone in which the data is to be written. Thus, the buffer is provided with a control signal f(i,k) which is dependent upon the disk velocity denoted by "i" and the zone denoted by the letter "k". In other words, write data enters the buffer at constant speed and is output at a variable speed dependent upon disk velocity and zone information.

In a read operation, using head 313, for example, data is read and passed to the multiplexer 320, amplified by the AE module 321 and then provided to a digital equalizer 322. The adaptive digital equalizer (filter) 322 compensates for amplitude variation in bit frequency arising, for example, in the head 313 and/or the arm electronics module 321. The digital equalizer 322 amplifies all frequencies of the recorded signals such that the overall amplification of each frequency is of the same amplitude. The digital equalizer 322 is coupled to a ROM 323 to receive a set of coefficients corresponding to the spindle speed (disk velocity) and the zone from which the data is read in response to the control signal f(i,k). The coefficients are precalculated values to be used to optimize the operation of the digital equalizer 322.

The output of the digital equalizer 322 is provided to the detector 324. The detector 324 is also provided with the control signal f(i,k) to optimize the clocking and detection operation of the detector on the basis of the spindle speed and the particular zone from which the data was read. The detector 324 detects data bits in the signal read using the head 313. Once the data bits now have been detected, error correction for soft errors may be further carried out in the detector 324. The data may then be passed into the buffer 326 and subsequently read from the buffer 326 to the host system interface 340 at a frequency which is accepted by the interface. This frequency, for example, may be the same as the frequency at which write data is received by buffer 325 from the host system interface 340.

A demodulator 317 is also shown receiving the output from the arm electronics module 321. The demodulator 317 extracts servo information from a signal read by the head 313 from equispaced radial servo patterns written on the disk. From the servo information the position error signal (PES) is derived and is provided to the actuator controller 315 to control the positioning of the head as described above. A detailed analysis of the above operation is provided in U.S. Pat. No. 5,285,327 entitled "Application for Controlling Reading and Writing in a Disk Drive", issued Feb. 8, 1994; U.S. Pat. No. 5,440,474 entitled "Magnetic Recording disk with Equally Spaced Servo Sectors Extending Across Multiple Data Bands", issued Aug. 8, 1995; and U.S. Pat. No. 5,210,660 entitled "Sectored Servo Independent of Data Architecture", issued May 11, 1993.

The control signals f(i) and f(i,k) are generated by a disk drive controller 335. The disk drive controller 335 is coupled to communicate with the host system interface 340 as indicated by line 341. The host system interface 340 provides addressing information, read/write commands designating the type of operation to be performed, and the like, to the disk drive controller 335. The address information may include, for example, a head number, a cylinder number or track number as well as a data sector number. The disk drive controller 335 may also communicate information to the host system interface 340. For example, the disk drive controller 335 may communicate status information to the host system interface along line 341. When the disk drive is initially powered up, the controller may perform operations independent of the host. While performing such operations the disk drive controller 335 may inform the host system interface 340 that the disk drive is busy and will further notify the host system interface when the drive is ready to perform access operations.

The disk drive controller 335 also receives a control mode signal 336 indicative of a desired operating frequency for the drive. This control mode signal 336 will indicate, for example, whether the disk drive should be operated at a lower spindle speed to conserve power. The control mode signal 336 is generated by an activity monitor 330 which may monitor the activity of the disk drive, for example, and instruct the disk drive controller 335 to change the spindle speed when a low power condition is to be entered. The activity monitor 330 may use information contained in ROM 331 which may include a look-up table (LUT) to determine when to change the spindle speed. The control mode signal 336 may be used to control, for example, a variable frequency oscillator in the disk drive controller 335. The frequency of this oscillator may then be used as a master frequency to control other elements in the disk drive. For example, the frequency of the oscillator may be provided to the phase locked loop (PLL) of the spindle controller 312 to control the spindle speed. The control mode signal 336 is determined on the basis of a mode of operation in which the disk drive is to be operated.

As can be appreciated from the above example, as the spindle speed changes the read frequency changes for the various zones. This increases the overall complexity of the system. For example, in the circuit described above, for each discrete spindle velocity the digital equalizer (filter) 322 must be loaded with filter configuration data for each zone from ROM 323. The configuration data is unique for each different zone bit frequency. Thus, as the number of zones and discrete spindle velocities used by the storage device increase, the number of different zone bit frequencies also increases.

Figures 1, 3B:
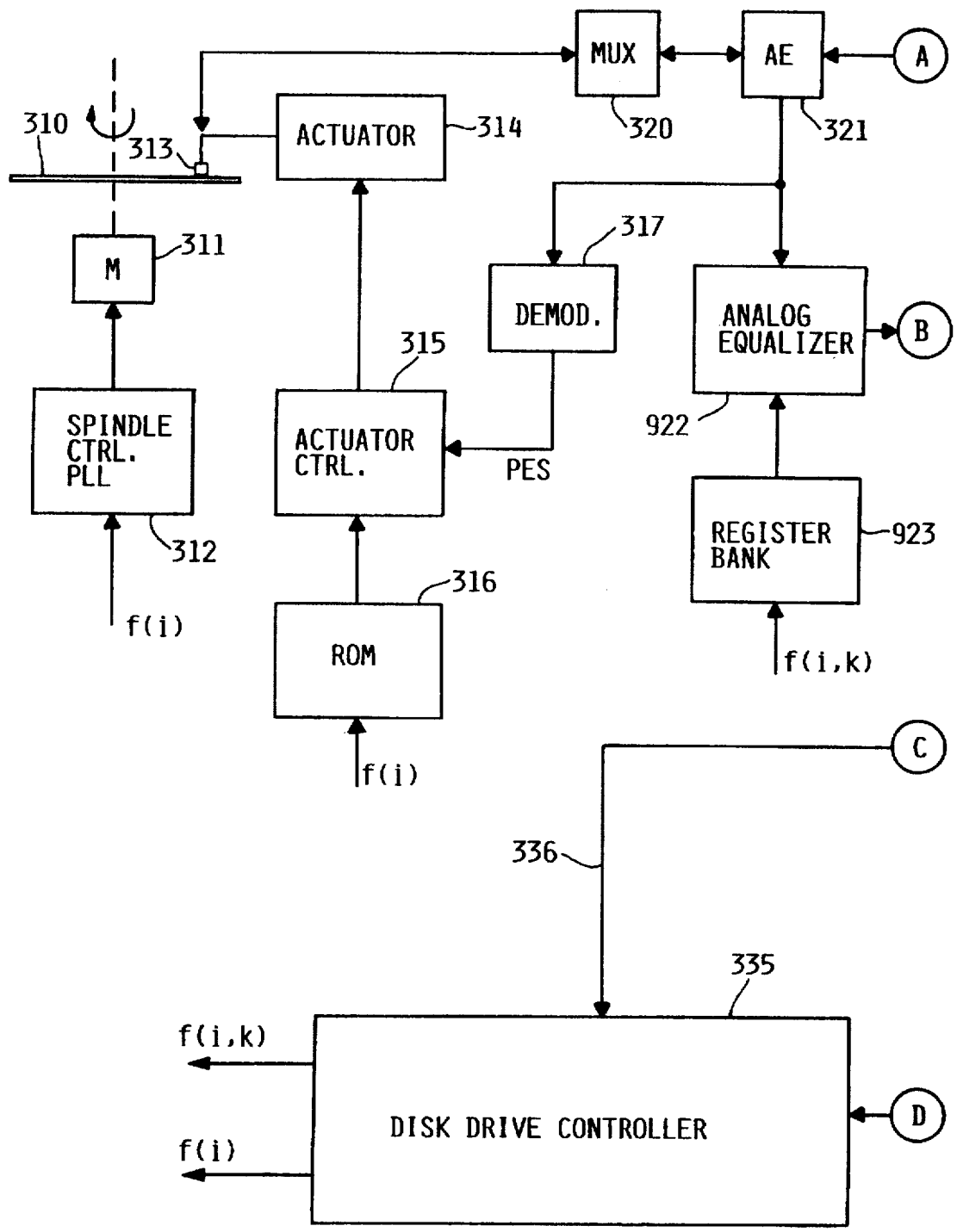
Figures 2, 3B:
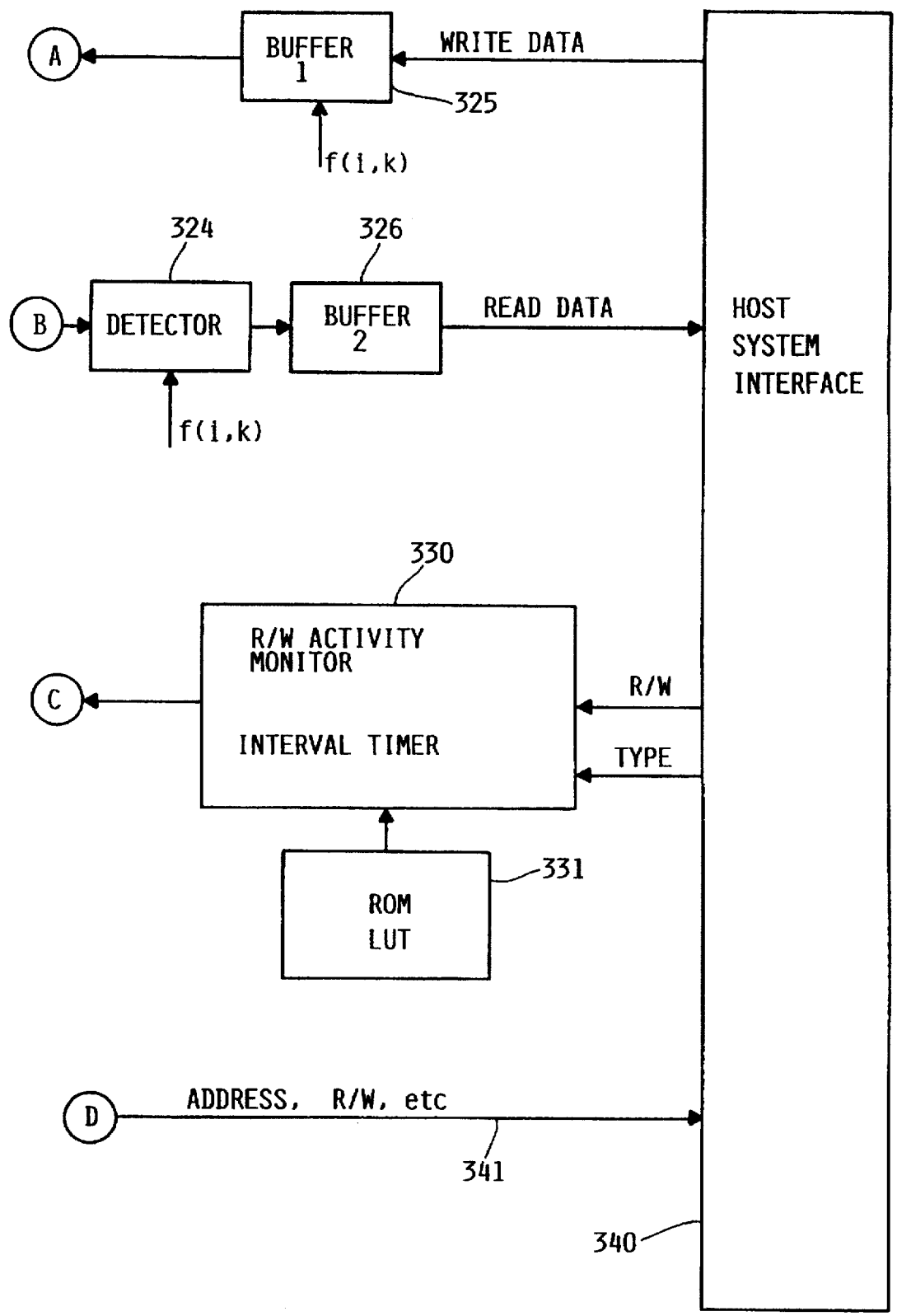

An increase in the number of different zone bit frequencies is even more problematic when an analog or hybrid digital/analog data channel is used. Such a channel, as illustrated in FIG. 3B, must include separate analog front end components for each different zone bit frequency used, adding significantly to the cost and size of the read channel. FIG. 3B is similar to FIG. 3A with like parts having like reference numerals. In FIG. 3B, a tunable analog equalizer 922 is incorporated into the read channel of the disk drive. The tunable analog equalizer 922 may consist of operational amplifiers with tunable RC networks having capacitors and banks of selectable resistors 923 used to change the coefficients of the analog equalizer 922. The resistor bank 923 includes a number of resistors that can be switched in parallel or series to make up different resistor values used by the analog equalizer 922. The different resistor values correspond to the coefficients needed by the analog equalizer 922 as the spindle speed is changed. Thus, different resistor values are used depending upon the spindle velocity and zone information provided to the resistor bank by the control signal f(i,k).

The incorporation of analog components into a read channel, as depicted in FIG. 3B, is useful when very high operating frequencies are used in the disk drive. Current disk drives may operate at recording signal frequencies in excess of 200 megahertz (MHz). At such a rates, analog-to-digital conversion circuitry becomes quite expensive. In order to reduce cost, the read channel may be implemented using more analog components. For example, detection can be simplified by using analog circuitry thereby reducing costs. Further, power dissipation may be reduced using analog components. As the operating speed of the disk drive is further increased the need to use analog devices in the read channel becomes even more important. However, when analog components are used in a multiple zone disk drive operating at a number of different spindle speeds, it may be necessary to include a large number of discrete components such as resistors to accommodate the different zone bit frequencies.

In each of the systems depicted in FIGS. 3A and 3B, the complexity and cost of the system increases for each zone bit frequency the system must handle. As described more fully below, by selectively partitioning the tracks into the multiple frequency zones, the number of different zone bit frequencies the drive must handle can be significantly reduced, thereby reducing the complexity of the drive. For example, the number of discrete analog components needed may be reduced.

In accordance with an embodiment of the invention, a disk is provided having its track locations specially partitioned in accordance with a geometric progression. Referring to the disk illustrated in FIG. 1, an operating frequency $f_i$, in hertz (Hz), for zone i may determined by the relationship $$f_i = d_i(2\pi r_i \omega_j/60),$$

where $d_i$ is the linear density at $r_i$ in zone $z_i$, $r_i$ is the inner radius of zone $z_i$, and $\omega_j$ is the discrete j-th disk annular velocity in revolutions per minute (RPM). This equation may be reduced to $$f_i = 0.1047 d_i r_i \omega_j.$$

and assuming that the maximum linear density for each zone is constant (i.e., $d_i = d_0$) for zones of equal width, the equation becomes $$f_i = 0.1047 d_0 r_i \omega_j.$$

The track locations on the disk are allocated into zones by selecting the appropriate radii for the inner track of each zone. In accordance with an embodiment of the invention, the inner track radii defining each zone are selected by a geometric progression which is a function of radius. As described more fully below, this method of banding tracks into zones provides for a high degree of overlap in zone bit frequencies between zones as the spindle velocity is changed. For example, a drive having N zones and operating at M different discrete spindle (disk) speeds will have a total number of different required zone bit frequencies equal to N+M−1. For example, a drive having 10 recording zones and operating at 10 discrete spindle speeds will require channel capable of handling 19 (i.e., 10+10−1=19) different zone bit frequencies.

In contrast, the number of different zone bit frequencies required for a disk banded according to a simple arithmetic progression is determined according to the relationship N+((M*M)−N)/2). In the above example, the number of zone bit frequencies which the channel must handle equals 55 (i.e., 10+(((10*10)−10)/2)=55). Thus, partitioning the tracks into zones in accordance with a geometric progression offers significant advantages in terms of reduced channel complexity and cost.

The advantages obtained by partitioning the tracks of a disk into zones according to a geometric progression will be better understood by the following comparison with a disk having zones allocated using a simple arithmetic progression.

Consider first disk having the inner band radii $r_i$, of each zone, follow a geometric progression. This may be expressed as $$r_i = r_{OD}^{1-ip}, \text{ for } i=1,2,\ldots,N,$$

where $\rho$ is a substantially fixed geometric coefficient for the progression.

The ratio between two adjacent zone radii $r_i$ and $r_{i+1}$, is constant providing the relationship:

$$r_i/r_{i+1} = r_{OD}^\rho,$$

for $i=1,2,\ldots N-1$.

For a disk having an inner radius $r_{ID}$, the coefficient, $\rho$, for a given number of data bands can be determined as follows:

$$ln(r_{ID}) = (1-N\rho)\, ln(r_{OD}),$$

which may be rewritten as:

$$\rho = 1/N(1-ln(r_{ID})/ln(r_{OD})).$$

By way of example, consider a 2.5 inch disk divided into 10 zones (N=10) and having an inner radius $r_{ID}$ of 14 mm, an outer radius $r_{OD}$ of 29.7 mm. The value of $\rho$ for a disk having these dimensions can be calculated as follows:

$$\rho = 1/10(1-ln(14)/ln(29.7)) = 0.022178.$$

Using the above value for $\rho$ the inner radius of each of the 10 zones will be determined as the geometric progression:

$$r_i = r_{OD}^{(1-0.022178i)}.$$

By way of contrast, the inner radii of each zone may be determined as an arithmetic progression. Here the difference between two adjacent inner zone radii $r_i$ and $r_{i+1}$ is a constant b providing the relationship $$r_i - r_{i+1} = b.$$

In this case, the radii $r_i$ can be expressed as $$r_i = r_{i-1} - b,$$

which yields the following radii $$r_1 = r_0 - b;$$

$$r_2 = r_1 - b = r_0 - 2b;$$

$$r_3 = r_2 - b = r_0 - 3b;$$

$$r_k = r_{k-1} - b = r_0 - kb.$$

Recalling the expression $f_i=0.1047d_\sigma r_i\omega_j$ and by substitution, the following equation for $f_i$ may be written:

$$f_i = 0.1047\, d_0\, (r_0 - ib)\, \omega_j.$$

This equation can also be written as $f_i = f_{0j} - i\Delta f_{0j}$ where $f_{0j} = 0.1047\, d_0\, r_0\omega_j$ and $\Delta f_{0j} = 0.1047\, d_0 b\omega_j$. Thus, a general equation for the zone bit frequency can be expressed as $$f_{ij} = (k_0 - i\Delta k)\omega_j$$

where $k_0 = 0.1047 d_0 r_0$, and $\Delta k = 0.1047 d_0 b$.

When the disk is rotated at full speed (i.e., when $\omega = \omega_i$ and $j=1$), the following relationship can be derived:

$$f_{11} = (k_0 - \Delta k)\, \omega_1;$$

$$f_{21} = (k_0 - 2\Delta k)\, \omega_1;$$

$$f_{31} = (k_0 - 3\Delta k)\, \omega_1;$$

$$f_{i1} = (k_0 - i\Delta k)\, \omega_1.$$

At a lower speed, when $\omega = \omega_2$ and $j=2$, the frequencies can be calculated as:

$$f_{12} = (k_0 - \Delta k)\, \omega_2;$$

$$f_{22} = (k_0 - 2\Delta k)\, \omega_2;$$

$$f_{32} = (k_0 - 3\Delta k)\, \omega_2;$$

$$f_{i2} = (k_0 - i\Delta k)\, \omega_2.$$

In order to reduce complexity of the read channel, it is desirable to have $f_{12} = f_{21}$ so that all but one of the frequencies at $\omega_1$ are reusable at the lower speed $\omega_2$. For this to occur, $(k_0 - \Delta k)\omega_2$ must equal $(k_0 - 2\Delta k)\omega_1$. It is also desired that $f_{22} = f_{31}$, which means that $(k_0 - 2\Delta k)\omega_2 = (k_0 - 3\Delta k)\omega_1$. For zone i, we need $f_{i2} = f_{(i+1)1}$ which means that $(k_0 - 1\Delta k)\omega_2 = (k_0 - (i+1)\Delta k)\omega_1$. The above constraints can be written as $\omega_2 = [(k_0 - (i+1)\Delta k)/(k_0 - i\Delta k)]\omega_1$, and for the $j^{th}$ speed $\omega_j$, the relationship may be expressed as $\omega_j = [(k_0 - (j+1)\Delta k)/(k_0 - \Delta k)]\omega_0$.

Consider the example described above using a 2.5" disk having the dimensions $r_{ID} = 14$ mm and $r_{OD} = 29.7$ mm with 10 zones divided into equal sized bands of approximately 1.57 mm (i.e., $b = (29.7-14)/10$). Assuming a linear density of data on the inner radius of each zone of 135 kilobits-per-inch (i.e., $d_0 = 5315$ bits per mm), the value of $k_0 = 0.1047\, d_0\, r_0 = 16527.47$ and $\Delta k = 873.67$. In this case, some of the spindle velocities, using the arithmetic progression for the inner band radii, may be determined as:

$$\omega_1 = [(k_0 - 2\Delta k)/(k_0 - \Delta k)]\omega_0 = 0.9442\, \omega_0$$

$$\omega_2 = [(k_0 - 3\Delta k)/(k_0 - \Delta k)]\omega_0 = 0.8884\, \omega_0$$

$$\omega_3 = [(k_0 - 4\Delta k)/(k_0 - \Delta k)]\omega_0 = 0.8326\, \omega_0$$

$$\omega_4 = [(k_0 - 5\Delta k)/(k_0 - \Delta k)]\omega_0 = 0.7768\, \omega_0$$

$$\omega_5 = [(k_0 - 6\Delta k)/(k_0 - \Delta k)]\omega_0 = 0.7209\, \omega_0$$

$$\omega_6 = [(k_0 - 7\Delta k)/(k_0 - \Delta k)]\omega_0 = 0.6651\, \omega_0.$$

Using the above relations, the following comparisons can be made between the geometric and arithmetic progression methods of selecting the inner band radii of the various zones. It is noted, that the storage capacity of a disk using the above-described geometric progression is substantially the same as that of a disk using the arithmetic progression.

Figure 4:
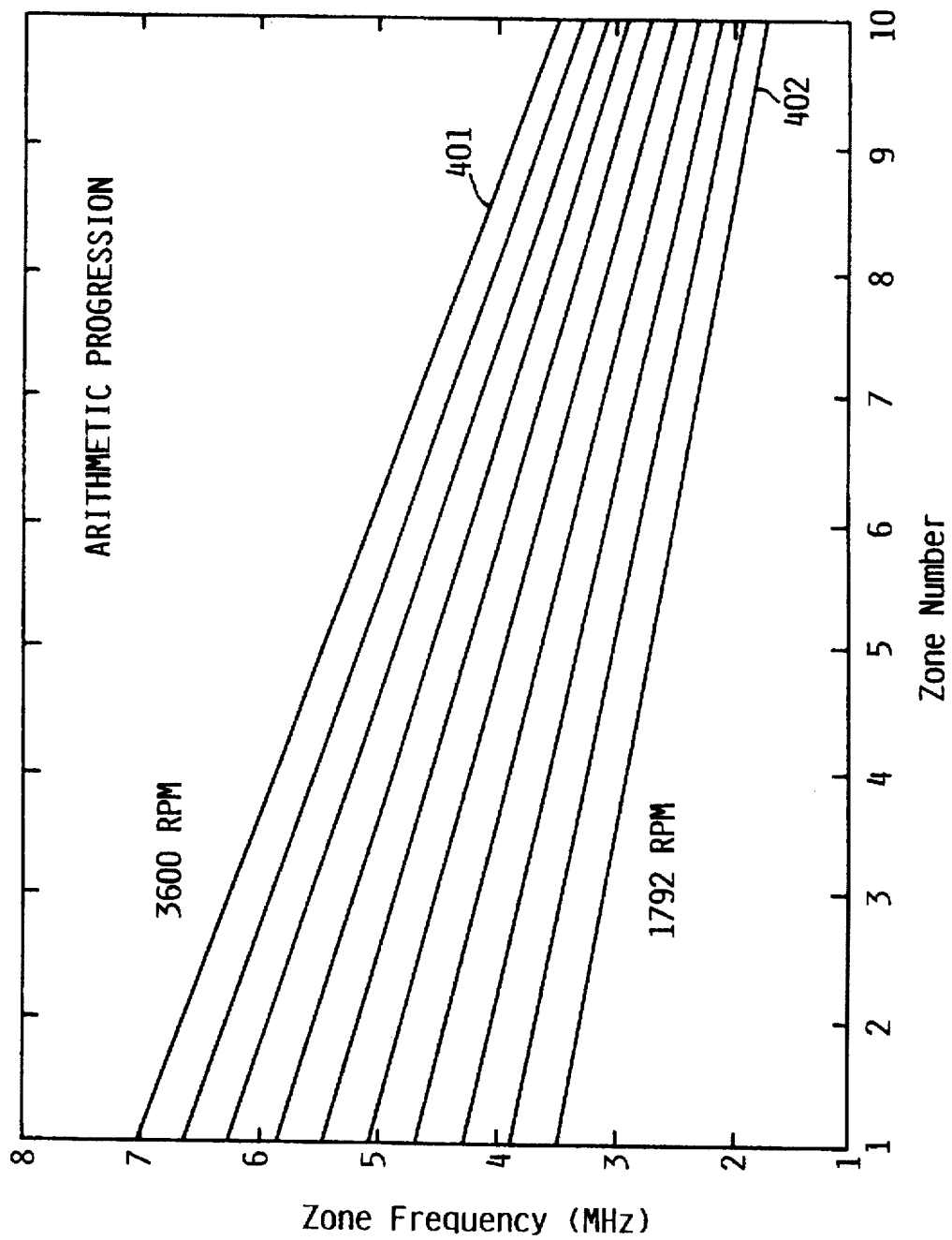
FIG. 4 illustrates a relationship between zone frequency and spindle motor velocity for tracks partitioned into zones according to an arithmetic progression.
Figure 5:
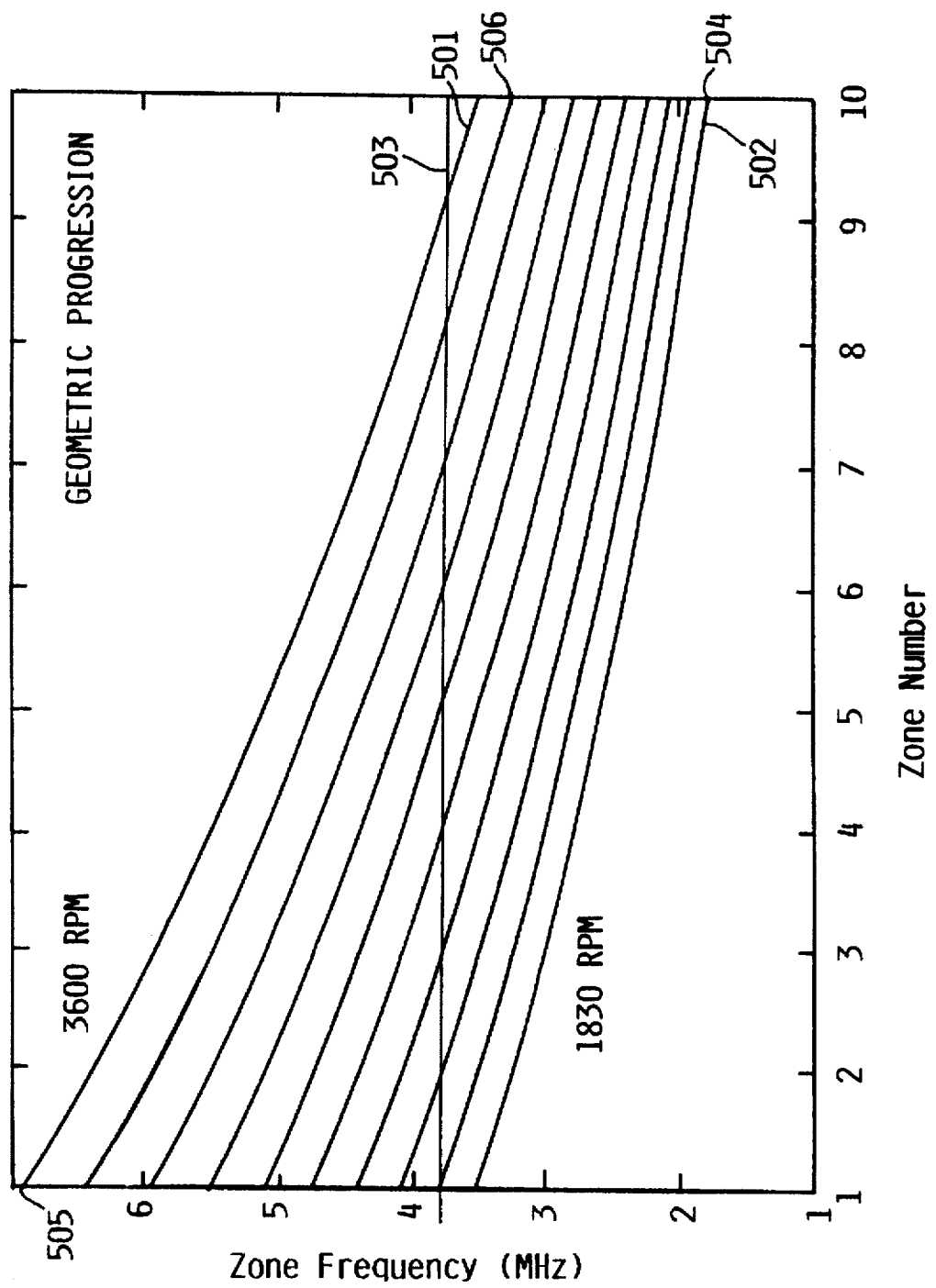
FIG. 5 illustrates a relationship between zone frequency and spindle motor velocity for tracks partitioned into zones according to a geometric progression.

In FIGS. 4 and 5, zone data rate frequencies versus the zone index position are graphed as a function of varying spindle motor speeds for zones banded using the arithmetic progression and the geometric progression, respectively. The spindle motor speed is varied over ten discrete drive speeds between a nominal speed of 3600 revolutions per minute (RPM), represented by lines 401 and 501 to 1792 RPM, represented by line 402 in the case of the arithmetic progression (FIG. 4) and 1830 RPM, represented by line 502 in the case of the geometric progression (FIG. 5).

A comparison of FIGS. 4 and 5 illustrates various advantages obtained by using a geometric progression to allocated tracks to zones. When the graph in FIG. 5 is viewed horizontally, it is noted that the zone bit frequencies line up along a horizontal line. For example, the zone bit frequency of 3.78 megahertz (MHz) extending along line 503 is used by each of zones 1–9 at different discrete spindle motor speeds. Moreover, all but two zone bit frequencies indicated at points 504 and 505 (corresponding to frequencies 1.78 MHz and 6.90 MHz) are used by more than one zone. It is further noted that the frequencies also align vertically. Thus, it should be appreciated that as the drive speed is reduced, the zone bit frequencies are shifted toward the outer diameter (OD) of the disk.

FIGS. 6A and 6B are tables depicting exemplary zone radii (for the inner radii for each zone in millimeters) and frequency in Megahertz for the geometric and arithmetic radii progressions, respectively, as a function of varying spindle speed (RPM). In FIG. 6A, representing the geometric progression, the zone frequencies are identical along the diagonals of the table. The diagonal relationship of the frequencies illustrates the above-noted advantageous characteristics of the geometric progression in tabular form.

Referring to FIG. 6A, the following example illustrates one of the advantages obtained by using the geometric progression to allocate track locations to zones. In zone number 2, when the disk is rotated at a nominal speed of 3600 RPM, the zone bit frequency is 6.3999 megabits/sec (MB/sec) (i.e., 6.399 MHz). If the drive speed is reduced to the next discrete speed of 3339 RPM, represented by line 506 in FIG. 5, the correct zone bit frequency for zone 2 is 5.9363 MB/sec. As illustrated in the table of FIG. 6A, this frequency was used by zone 3 when the spindle speed was 3600 RPM. Similarly, the zone data rate used by zone 2 at 3600 RPM is now used in zone 1. In this manner, the zone data rates shift toward the outer diameter of the disk. At the innermost zone, zone 10 in the illustrated example, a new zone bit frequency is needed by the data channel for each reduction in spindle motor speed. It should now be appreciated that for drives having N zones and M spindle speeds, the number (F) of zone bit frequencies required may be described by the relation $F = N + M - 1$.

As illustrated in FIGS. 4 and 6B, when the rotational speed is reduced using a disk having zones banded using an arithmetic progression, the number of zone bit frequencies which may be reused by other zones is significantly less than a disk having zones allocated using the geometric progression. Thus, it should be appreciated that the complexity and cost of the data channel can be significantly reduced by allocating zones according to the geometric progression.

It should be appreciated that the above geometric progression provides a method for allocating tracks on a disk into zones in a manner which minimizes the number of different zone bit frequencies a storage device using the disk must handle. Other factors, however, may also need to be taken into account when allocating tracks into zones. For example, it is generally desirable that the data tracks be divided into an integral number of data block. Thus, when determining the inner radius of a zone, the specific allocation may be altered taking this factor into account. In general, it is desirable that the linear density of data at the inner radius of each zone be substantially constant.

It is also noted that maximizing the storage capacity of the disk is also desirable. In certain instances, the allocation of tracks into zones on a portion of the disk may be carried out using the geometric progression, while tracks on another portion of the disk may be allocated to zones using some other method of allocation such as the arithmetic progression. While this may increase the number of different discrete zone bit frequencies which must be handled by the storage device, this trade off may be desirable in view of other considerations.

While the invention has been described above in connection with various embodiments, it will be apparent from the above disclosure that the implementation may be used with various other systems and embodiments. Thus, the various embodiments described above are provided by way of illustration only and should not be construed to limit the invention. Those skilled in the art will readily recognize various modifications and changes which may be made to the present invention without strictly following the exemplary embodiments and applications illustrated and described herein, and without departing from the true spirit and scope of the present invention which is set forth in the following claims.

What is claimed is:

1. A disk for use in a memory storage device, the disk comprising a plurality of tracks provided around at least a portion of a surface of the disk, the plurality tracks being partitioned into N concentric bands, N being an integer greater than 2, the N concentric bands being respectively defined by corresponding band radii $r_i$, a ratio of corresponding radii $r_i$ of any two adjacent ones of the N concentric bands being substantially constant.

2. A disk as recited in claim 1, wherein the corresponding radii $r_i$ comprises an inner radius of the N concentric bands, and wherein the ratio of the corresponding radii $r_i$ of two adjacent ones of the N concentric bands is determined according to a relationship $$r_i/r_{i+1} = r_{OD}^\rho,$$

where $r_{OD}$ is an outer radius of the disk, $r_i$ and $r_{i+1}$ are inner radii of two adjacent concentric bands and $\rho$ is a substantially fixed coefficient defining a progression of the radius $r_i$.

3. A disk as recited in claim 1, wherein data is stored at an inner track location of each of the N concentric bands at a substantially constant linear density.

4. A disk as recited in claim 1, wherein the disk further comprises a plurality of additional concentric bands on a portion of the disk exclusive of the N concentric bands, the additional concentric bands having an equal radial widths.

5. A method of allocating concentric track locations on a disk storage medium into N concentric zones, N being an integer greater than 2, data being stored on the disk at an inner radius of each zone at a substantially constant linear density, the method comprising the step of selecting radii $r_i$ defining each of the N concentric zones such that a ratio of radii $r_i$ defining any two adjacent ones of the N concentric zones is substantially constant.

6. A method as recited in claim 5, wherein the step of selecting comprises the step of selecting the radii $r_i$ according to a relationship $$r_i/r_{i+1} = r_{OD}^\rho,$$

where $r_{OD}$ is an outer radius of the disk, $r_i$ and $r_{i+1}$ are radii defining two adjacent concentric zones and $\rho$ is a substantially fixed coefficient defining a progression of the radii $r_i$.

7. A method as recited in claim 5, further comprising the step of allocating additional track locations on the disk storage medium into a plurality of additional concentric zones having substantially equal radial widths.

8. A method as recited in claim 5, wherein the radius $r_i$ is the inner radius of each zone.

9. A method as recited in claim 8, wherein the step of selecting comprises the step of selecting the radii $r_i$ according to a relationship $$r_i/r_{i+1} r_{OD}^\rho,$$

where $r_{OD}$ is an outer radius of the disk, $r_i$ and $r_{i+1}$ are inner radii defining two adjacent concentric zones and $\rho$ is a substantially fixed coefficient defining a progression of the radii $r_i$.

10. A storage device, comprising:
- a disk including a plurality of tracks provided around at least a portion of a surface of the disk, the plurality tracks being partitioned into N concentric bands, N being an integer greater than 2;
- a motor coupled to the disk to rotate the disk at M different discrete velocities, M being an integer greater than 1;
- a transducer mounted adjacent a surface of the disk; and
- a data channel, coupled to the transducer, the data channel operating to access tracks in the N concentric bands at a number of different zone bit frequencies F according to a relation F=N+M−1.

11. A storage device as recited in claim 10, wherein the N concentric bands are respectively defined by inner radii of the concentric bands, the inner radii of the concentric bands being determined by a geometric progression as a function of radius.

12. A storage device as recited in claim 10, wherein the N concentric bands are respectively defined by inner radii $r_i$ of the concentric bands, inner radii $r_i$ of two adjacent concentric bands being determined according to a relationship $$r_i = r_{i+1} * r_{OD}^\rho,$$

where $r_{OD}$ is an outer radius of the disk and $\rho$ is a substantially fixed coefficient defining a progression of the inner radii $r_i$.

13. A disk for use in a memory storage device, the disk comprising:
- a first zone having a first group of concentric data tracks, the first zone being defined by a first radius $R_1$;
- a second zone having a second group of concentric data tracks, the second zone being defined by a second radius $R_2$;
- a third zone having a third group of concentric data tracks, the third zone being defined by a third radius $R_3$, wherein a ratio of the first radius $R_1$ to the second radius $R_2$ is substantially equal to a ratio of the second radius $R_2$ to the third radius $R_3$.

14. A disk as recited in claim 13, wherein the ratio of the first radius $R_1$ to the second radius $R_2$ and the ratio of the second radius $R_2$ to the third radius $R_3$ satisfies a relationship $$R_1/R_2 = R_2/R_3 = r_{OD}^\rho,$$

where $r_{OD}$ is an outer radius of the disk and $\rho$ is a substantially fixed coefficient defining a progression of radii for the first, second and third zones.

15. A disk as recited in claim 13, further comprising a fourth and a fifth zone each having a substantially constant radial width.

* * * * *